United States Patent [19]

Kawahara et al.

[11] 4,410,590
[45] Oct. 18, 1983

[54] MAGNETIC RECORDING MEDIUM

[75] Inventors: Hiroshi Kawahara; Hitoshi Azegami; Eiji Horigome, all of Tokyo, Japan

[73] Assignee: TDK Electronics Co., Ltd., Tokyo, Japan

[21] Appl. No.: 311,180

[22] Filed: Oct. 14, 1981

[30] Foreign Application Priority Data

Oct. 14, 1980 [JP] Japan .............................. 55-143395

[51] Int. Cl.³ ............................................ H01F 10/02
[52] U.S. Cl. .................................. 428/336; 428/457; 428/694; 428/900
[58] Field of Search .............................. 427/127–132, 427/48; 428/900, 694, 329, 336, 457

[56] References Cited

U.S. PATENT DOCUMENTS 4,265,931   5/1981   Tamai et al. .................... 427/131 X Primary Examiner—Bernard D. Pianalto
Attorney, Agent, or Firm—Oblon, Fisher, Spivak, McClelland & Maier

[57] ABSTRACT

A magnetic recording medium comprises a lower magnetic layer containing a magnetic powder having a coercive force of 700 Oe or higher dispersed in an organic binder which is coated on a non-magnetic substrate and an upper magnetic layer containing a magnetic powder having a coercive force higher than the coercive force of said lower magnetic la 4 Claims, 2 Drawing Figures

MAGNETIC RECORDING MEDIUM

BACKGROUND OF THE INVENTION

Field of the Invention

Recently, a metallic magnetic powder for high recording density has been used instead of $\gamma\text{-Fe}_2\text{O}_3$, $\text{Fe}_3\text{O}_4$ and cobalt-adsorbed $\gamma\text{-Fe}_2\text{O}_3$ which have been used in an audio cassette tape whereby electromagnetic characteristics (sensitivity and MOL) in high frequency region have been remarkably improved. The metallic magnetic powder which is used in practice, usually has a coercive force of about 1100 Oe. In an audio cassette, the metallic magnetic powder having the standard coercive force has been usually used. The standard coercive force is considered in view of magnetic characteristics (squareness ratio and orientation) of the metallic magnetic powder and a magnetic head of a recording device. The standard coercive force is about twice of the coercive forces of the chromium type magnetic powder and cobalt-adsorbed magnetic powder which have been used. Therefore, the characteristics in high frequency region are excellent, however, the characteristics in low frequency region especially maximum output level (MOL) are inferior. Thus, the advantage of high maximum output level in high frequency region is not so effective. When the maximum output level is high, the input level in the recording can be improved whereby excellent S/N can be imparted in the recording. However, when the maximum output level in low frequency region is low even though the maximum output level in high frequency region is high, the low frequency component is distorted by increasing the input in the recording, though the high frequency component of the original sound can be recorded at excellent S/N. It could not increase the input level in the recording to be so high if a low distortion in the whole frequency regions is required in the recording. Therefore, in the conventional magnetic recording medium using the metallic magnetic powder, the maximum output level in high frequency region could not effectively utilized.

It has been known that a magnetic recording medium having double magnetic layers using a magnetic powder having high coercive force in an upper layer and a magnetic powder having low coercive force imparts high electromagnetic characteristics. However, the conventional a two magnetic layer type recording tape has disadvantages of high distortion in middle frequency region and high output fluctuation.

SUMMARY OF THE INVENTION

It is an object of the present invention to provide a double magnetic layer type recording medium having low distortion in middle frequency region and low output fluctuation by controlling a coercive force in a lower magnetic layer.

The foregoing and other objects of the present invention have been attained by providing a magnetic recording medium which comprises a lower magnetic layer containing a magnetic powder having a coercive force of 700 Oe or higher dispersed in an organic binder which is coated on a non-magnetic substrate and an upper magnetic layer containing a magnetic powder having a coercive force higher than the coercive force of said lower magnetic layer.

DETAILED DESCRIPTION OF THE PREFERRED EMBODIMENTS

In accordance with the present invention, a magnetic layer containing a cobalt adsorbed $\gamma\text{-Fe}_2\text{O}_3$, a cobalt-adsorbed $\text{Fe}_3\text{O}_4$ and/or a metallic magnetic powder having a coercive force of 700 Oe or higher preferably 700 to 900 Oe is formed as the lower layer and a magnetic layer containing a cobalt-adsorbed $\gamma\text{-Fe}_2\text{O}_3$, a cobalt-adsorbed $\text{Fe}_3\text{O}_4$ and/or a metallic magnetic powder having a coercive force higher than that of the lower layer is formed as the upper layer in a thickness of 1.5 to 4.0 $\mu$m especially 1.5 to 2.5 $\mu$m so as to provide a double magnetic layer type recording medium having excellent maximum output level in whole frequency regions and excellent S/N which can be used in higher input level in the recording.

Figure 1:
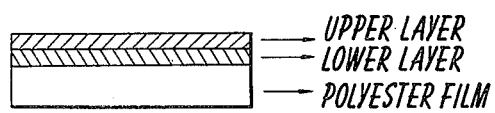
FIG. 1 shows a double magnetic layer structure.
Figure 2:
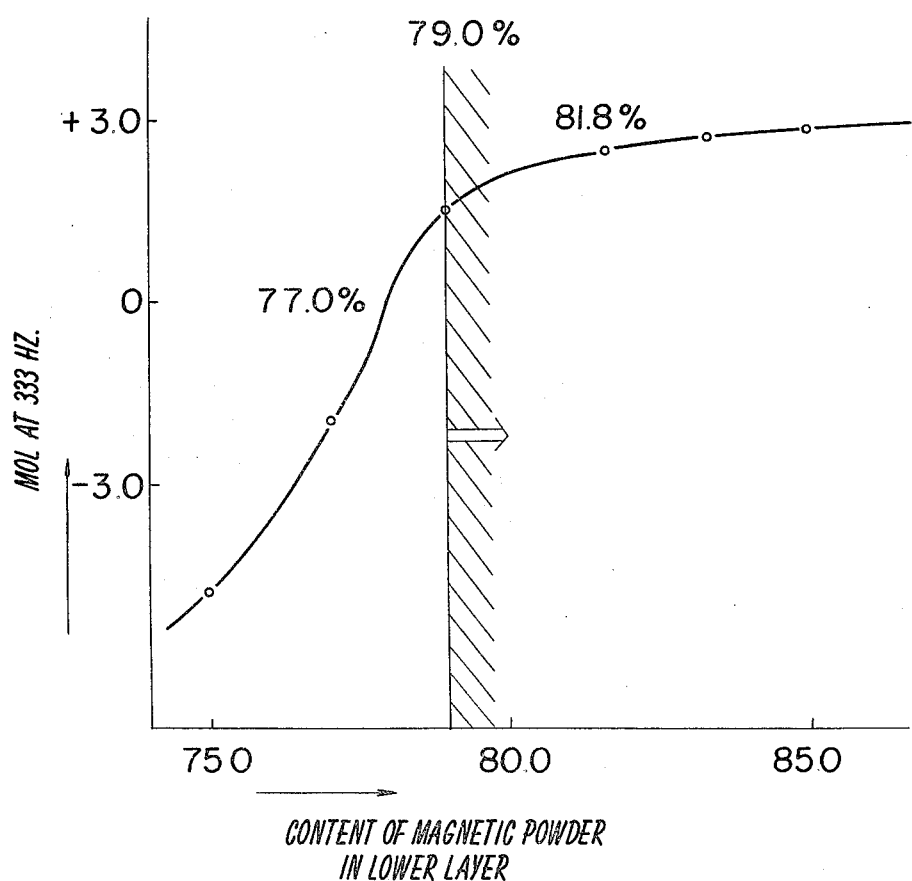
FIG. 2 is a graph showing the relation of the maximum output level at 333 Hz to contents of the magnetic powder in a lower magnetic layer.

As shown in FIG. 2, in the case of a coercive force of the magnetic powder in the lower magnetic layer of 700 Oe, the maximum output level in low frequency region (333 Hz) is remarkably increased at a content of the magnetic powder of 79% or more. When a thickness of the upper magnetic layer is 1.5 $\mu$m or more, excellent surface condition is attained without effect of roughness of the lower magnetic layer, whereby the output fluctuation is improved.

The present invention will be further illustrated by certain examples and references which are provided for purposes of illustration only and are not intended to be limiting the present invention.

EXAMPLE 1

| | |
|---|---|
| Magnetic powder: cobalt adsorbed $\gamma\text{-Fe}_2\text{O}_3$: | 100 wt. parts |
| Vinyl chloride-vinylacetate copolymer: | 10 wt. parts |
| (Eslex A: Sekisui Chemical Co.) | |
| Urethan prepolymer | |
| (#2304: Nippon Polyurethane K.K.): | 10 wt. parts |
| Dispersing agent: lecithin: | 5 wt. parts |
| Methyl ethyl ketone: | 80 wt. parts |
| Methyl isobutyl ketone: | 80 wt. parts |
| Toluene: | 80 wt. parts |

A mixture of these components was kneaded in a ball mill for 36 hours and 3 wt. parts of a curing agent of isocyanate (Colonate L: manufactured by Nippon Polyurethane K.K.) was admixed to prepare a magnetic composition for the first layer. This was coated on a polyester film. The magnetic powder was orientated and the surface was dried and processed and heated at 60° C. for 48 hours to crosslink the polyurethane resin. The first layer had a thickness of 2.5 $\mu$m.

| | |
|---|---|
| Magnetic powder: metallic magnetic powder: | 100 wt. parts |
| Vinyl chloride-vinylacetate copolymer: | 20 wt. parts |
| (Eslex A: Sekisui Chemical Co.) | |
| Urethane prepolymer | |
| (#2304: Nippon Polyurethane K.K.): | 5 wt. parts |
| Dispersing agent: lecithin: | 5 wt. parts |
| Methyl ethyl ketone: | 100 wt. parts |
| Methyl isobutyl ketone: | 100 wt. parts |
| Toluene: | 100 wt. parts |

A mixture of these components was kneaded in a ball mill for 48 hours and coated on the first layer. The magnetic powder was orientated and the surface was dried and processed. The thickness of the upper layer was 1.5 μm. The double magnetic layer type recording medium was obtained. The magnetic powder used in the lower magnetic layer had a coercive force of 700 Oe and the metallic magnetic powder used in the upper magnetic layer had a coercive force of 1100 Oe.

EXAMPLE 2

In accordance with the process of Example 1 except that a metallic magnetic powder having a coercive force of 730 Oe was used as the magnetic powder in the lower magnetic layer, a double magnetic layer type recording medium was prepared. In general, when a coercive force of a metallic magnetic powder is low as about 700 Oe, an orientation is not satisfactory and a single magnetic layer type recording medium prepared by using such magnetic powder has serious unbalanced coercive force and residual magnetization and could not impart desirable characteristic because of high output in low frequency region and low output in high frequency region.

In accordance with the present invention, the double magnetic layer structure is given and the upper magnetic layer is effective for the high frequency region and effect of the low orientation in the lower layer is not imparted because of high residual magnetization of the metallic magnetic powder.

EXAMPLE 3

In accordance with the process of Example 1 except that a cobalt-adsorbed $Fe_3O_4$ having a coercive force of 1100 Oe was used as the magnetic powder in the upper magnetic layer, a double magnetic layer type recording medium was prepared.

REFERENCE 1

In accordance with the process of Example 1 except that a cobalt-adsorbed $\gamma\text{-}Fe_2O_3$ having a coercive force of 650 Oe was used as the magnetic powder in the lower magnetic layer, a double magnetic layer type recording medium was prepared.

REFERENCE 2

In accordance with the process of Example 1 except that only the magnetic powder composition for the lower magnetic layer was coated in a thickness of 4.5 μm, a single magnetic layer type recording medium was prepared.

REFERENCE 3

In accordance with the process of Example 1 except that only the magnetic powder composition for the upper magnetic layer was coated in a thickness of 4.5 μm, a single magnetic layer type recording medium was prepared.

Each maximum output level of each sample was measured. The results are shown in Table. The maximum output level of TDK SA standard type was given as 0 dB.

TABLE

| Sample | Structure | Coercive force (total) Oe | Maximum output level (dB) | | |
|---|---|---|---|---|---|
| | | | 333 Hz | 3 K Hz | 16 K Hz |
| Example 1 | double | 840 | +2.5 | +2.4 | +3.5 |
| Example 2 | double | 840 | +3.2 | +3.2 | +3.5 |
| Example 3 | double | 840 | +2.6 | +2.5 | +2.9 |
| Reference 1 | double | 840 | +2.8 | +1.7 | +3.3 |
| Reference 2 | single | 700 | +2.5 | +2.3 | +0.5 |
| Reference 3 | single | 1100 | +0.3 | +1.8 | +3.6 |

In Examples 1 to 3, excellent characteristics MOL were imparted in whole frequency regions without unbalanced lower characteristics in certain frequency region.

In Reference 1, the characteristic MOL in middle frequency region is lower than those in the low and high frequency regions as the middle low MOL phenomenon.

In Reference 2 (single magnetic layer), the characteristic MOL in high frequency region is remarkably lower than those of the low and middle frequency regions.

In Reference 3, (single magnetic layer containing metallic magnetic powder), this corresponds to the conventional metallic recording tape. The characteristic MOL in low frequency region is remarkably low.

In accordance with the present invention, the characteristic MOL (maximum output level) are high and flat in whole frequency regions.

We claim:

1. A magnetic recording medium which comprises a lower magnetic layer containing a magnetic powder having a coercive force of 700 Oe or higher dispersed in an organic binder which is coated on a non-magnetic substrate and an upper magnetic layer containing a magnetic powder having a coercive force higher than the coercive force of said lower magnetic layer dispersed in an organic binder which is coated on said lower magnetic layer and said lower magnetic layer has a content of said magnetic powder of 79% or more wherein the content of said magnetic powder is given by the equation:

$$\frac{\text{Weight of magnetic powder}}{\text{Weight of magnetic powder} + \text{Weight of binder}} \times 100.$$

2. The magnetic recording medium according to claim 1 wherein said lower magnetic layer contains at least one of a cobalt-adsorbed $\gamma\text{-}Fe_2O_3$, a cobalt-adsorbed $Fe_3O_4$ and a metallic magnetic powder.

3. The magnetic recording medium according to claim 1 wherein said upper magnetic layer contains at least of a cobalt-adsorbed $\gamma\text{-}Fe_2O_3$, a cobalt-adsorbed $Fe_3O_4$ and a metallic magnetic powder.

4. The magnetic recording medium according to claim 1 wherein said upper magnetic layer has a thickness of 1.5 μm or more.

* * * * *